United States Patent [19]

Doerr et al.

[11] Patent Number: 5,923,449
[45] Date of Patent: Jul. 13, 1999

[54] OPTICALLY RESTORABLE WDM RING NETWORK USING SIMPLE ADD/DROP CIRCUITRY

[75] Inventors: Christopher Richard Doerr, Atlantic Highlands; Bernard Glance, Colts Neck; Ivan P. Kaminow, Holmdel, all of N.J.

[73] Assignee: Lucent Technologies Inc., Murray Hill, N.J.

[21] Appl. No.: 08/753,654

[22] Filed: Dec. 27, 1996

Related U.S. Application Data

[63] ntinuation of application No. 08/528,485, Sep. 14, 1995., Pat. No. 5,625,478

[51] Int. Cl.⁶ ........................................... H04J 14/02
[52] U.S. Cl. .................... 359/125; 359/110; 359/119; 340/827; 371/20.6; 370/223
[58] Field of Search ........................ 359/110, 118–119, 359/125, 127–128, 152, 167, 173, 177; 340/827; 371/20.6; 395/182.02; 370/248, 223, 403

[56] References Cited

U.S. PATENT DOCUMENTS 4,973,953  11/1990  Shimokawa et al. ................... 359/119
5,069,521  12/1991  Hardwick ............................. 359/110

*Primary Examiner*—Kinfe-Michael Negash

[57] ABSTRACT

A parallel ring network is restorable upon sensing a failure of a transmission media. A central transmitter is coupled to one end of a first transmission medium. A central receiver is coupled to one end of a second transmission medium. A central sensor senses a transmission media failure centrally and provides a central alarm. In response to the central alarm, the central receiver is coupled to another end of the first transmission medium and the central transmitter is coupled to another end of the second transmission medium. At least one local station has a local receiver, a local transmitter, a local sensor for sensing a transmission media failure locally and providing a local alarm, and a local switch. In response to the local alarm, the local switch moves from a first position to a second position. When the local switch is in the first position, the local transmitter is coupled to the second transmission medium and the local receiver is coupled to the first transmission medium. When the local switching means is in the second position, the local transmitter is coupled to the first transmission medium and the local receiver is coupled to the second transmission medium. A method for restoring the parallel ring network is described.

19 Claims, 5 Drawing Sheets

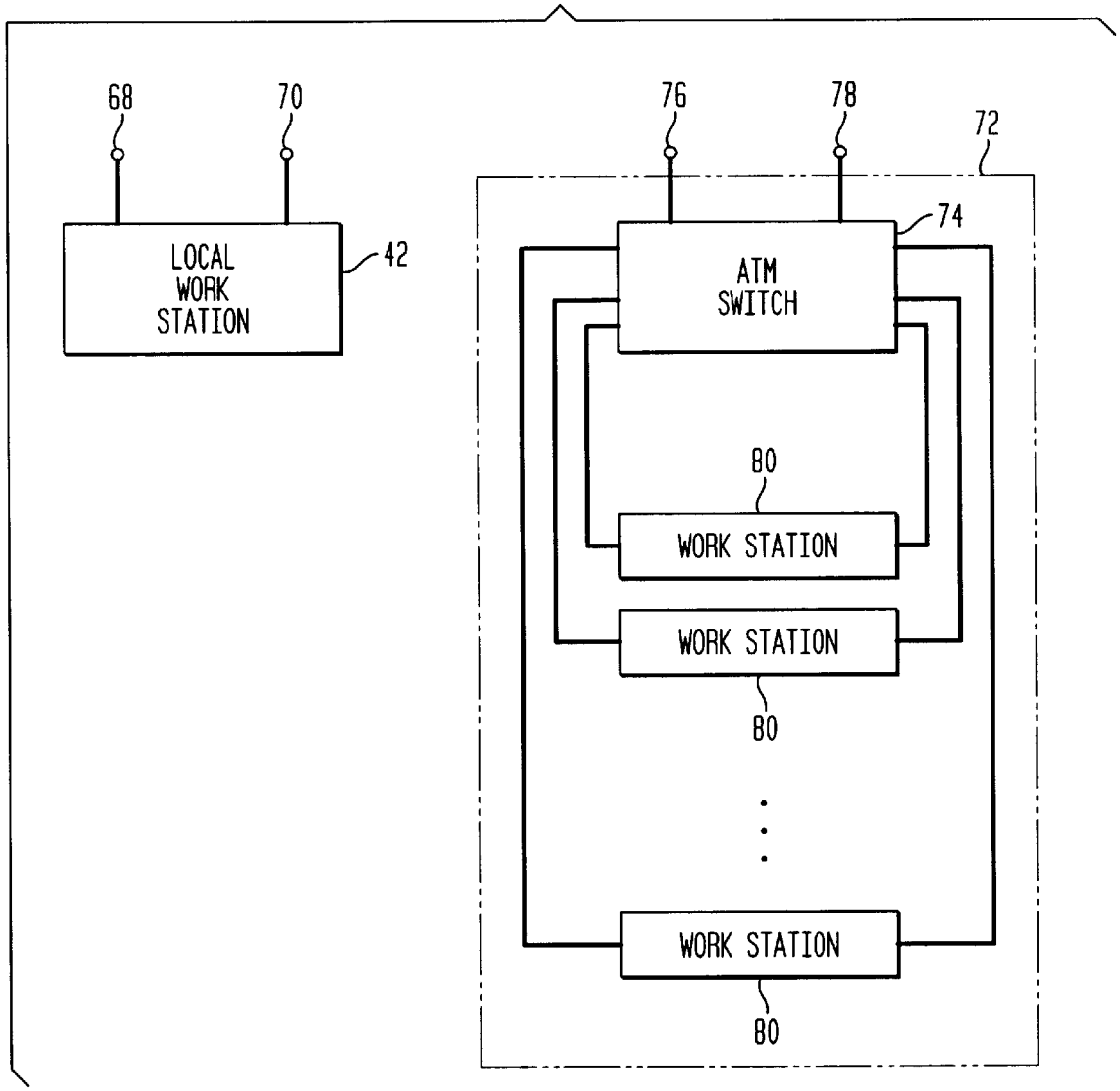

OPTICALLY RESTORABLE WDM RING NETWORK USING SIMPLE ADD/DROP CIRCUITRY

This application is a continuation of application Ser. No. 08/528,485 filed Sep. 14, 1995 now U.S. Pat. No. 5,625,478.

FIELD OF THE INVENTION

This invention relates to an optical communications system, and more particularly to an optically restorable parallel ring network.

BACKGROUND OF THE INVENTION

Optical communication systems are desirable because of the wide bandwidths available for the information signal channels. In general, there is a direct trade off between increased bandwidth capabilities and vulnerability to large scale channel disruption by transmission medium failure. The ability of a network to be restorable is increasingly important with increasing bandwidth capability. Wavelength division multiplexed (WDM) optical networks are particularly desirable because of their restoration capabilities and suitability for minimizing the optical fiber length for the interconnection of system nodes. In order to provide restoration capabilities in the event of a fiber break a WDM ring network requires at least two parallel fibers.

SUMMARY OF THE INVENTION

The present invention is a restorable parallel ring network. A parallel ring network is restorable upon sensing a failure of a transmission media. A central transmitter is coupled to one end of a first transmission medium. A central receiver is coupled to one end of a second transmission medium. A central sensing means senses a transmission media failure centrally and provides a central alarm. In response to the central alarm, the central receiver is coupled to another end of the first transmission medium and the central transmitter is coupled to another end of the second transmission medium. At least one local station has a local receiver, a local transmitter, a local sensing means for sensing a transmission media failure locally and providing a local alarm, and a local switching means. In response to the local alarm, the local switching means moves from a first position to a second position. When the local switching means is in the first position, the local transmitter is coupled to the second transmission medium and the local receiver is coupled to the first transmission medium. When the local switching means is in the second position, the local transmitter is coupled to the first transmission medium and the local receiver is coupled to the second transmission medium. A method for restoring the parallel ring network is described.

A method for restoring a parallel ring network in accordance with the present invention is described. The method includes the steps of first sensing a transmission medium failure centrally. Providing a central alarm signal in response to the failure. Coupling an end of the first transmission medium downstream of the failure to the central receiver and coupling the second transmission medium downstream of the fiber failure to the central transmitter in response to the central alarm signal. Sensing a transmission medium failure locally. Providing a local alarm signal in response to the failure. Switching the local transmitter from the second transmission medium to the first transmission medium and switching the local receiver from the first transmission medium to the second transmission medium in response to the local alarm signal. Additionally transmitting from each of the local transmitters at an operating frequency different than each of the local receivers and stopping the central transmitter momentarily from transmitting a signal to each of the local stations wherein the local transmitter corresponds to each of the local stations isolated by the fiber failure from the central receiver will allow the network to recover for the failure of a single transmission medium.

DESCRIPTION OF THE DRAWINGS

The present invention is described in detail below in conjunction with the drawings, of which:

FIG. 2 shows a schematic illustration of a local network which can replace the local work station in the optically restorable WDM ring network.

DETAILED DESCRIPTION OF VARIOUS ILLUSTRATIVE EMBODIMENTS

Although the present invention, restorable parallel ring network using simple add/drop circuitry, is particularly well suited to multimedia services provided by a server through an optical fiber media, and shall be described with respect to this application, the methods and apparatus disclosed here can be applied to other ring networks having other parallel transmission media. Although the present invention is particularly well suited to a parallel ring network employing wavelength division multiplexed (WDM) signals, and shall be described with respect to this application, the methods and apparatus disclosed here can be applied to other methods of signal multiplexing including time division multiplexing and other methods of frequency multiplexing with appropriate changes to multiplexing, demultiplexing and filtering which are well known to those skilled in the art.

An optically restorable ring network WDM, utilizes one fiber as a central transmitter bus and a second fiber as a central receiver bus, between local stations and a central office or switching hub. In the event of a fiber break, data traffic is restored utilizing both buses which are connected to the central office. The restoration occurs in 50 msec, resulting in no visible degradation during multisession video asynchronous transfer mode (ATM) traffic.

Figure 1A:
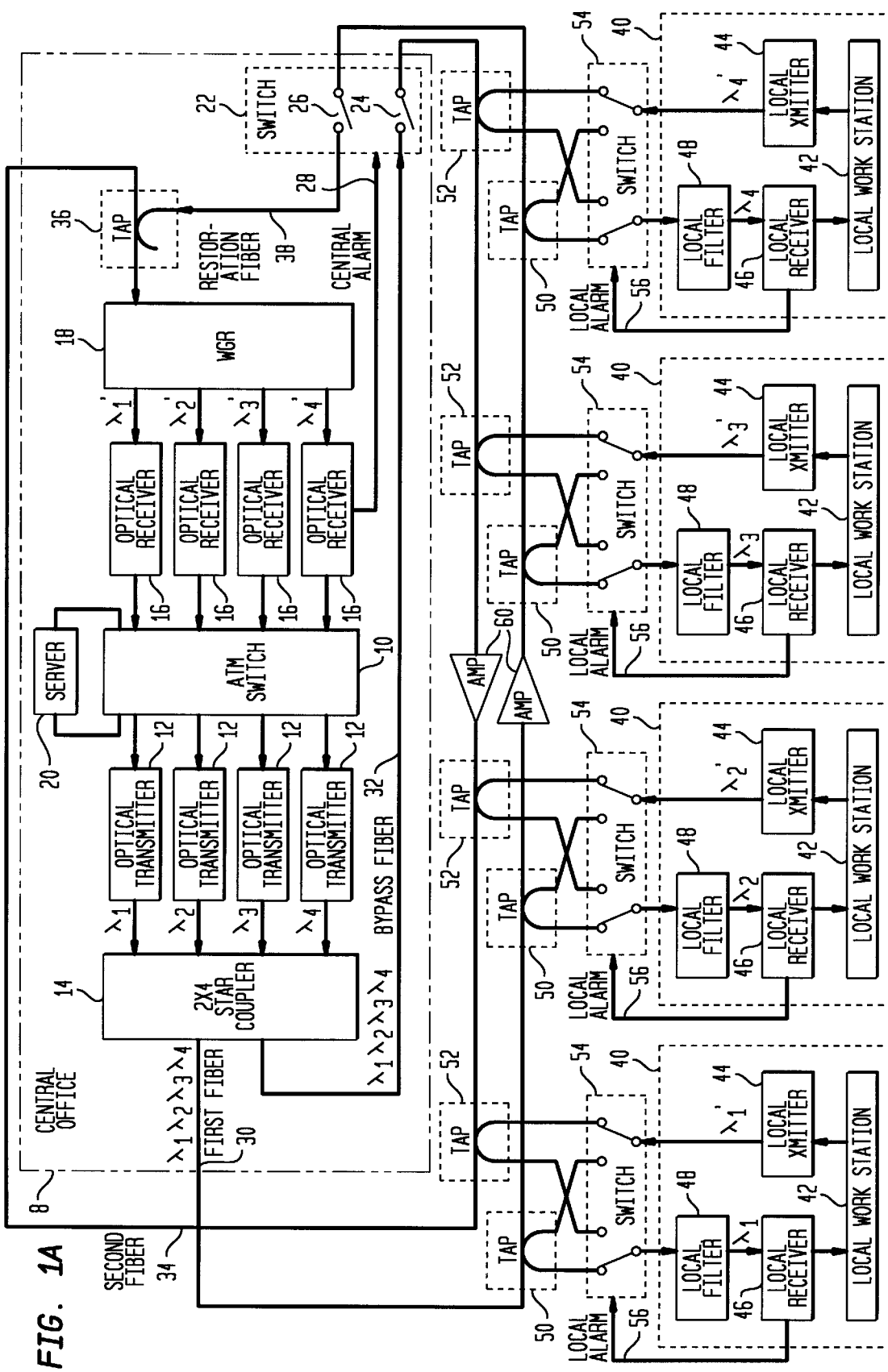
FIG. 1A shows a schematic illustration of an optically restorable WDM ring network in normal operation.

Referring to FIG. 1A there is shown a schematic representation of an optically restorable WDM ring network in the normal mode of operation. At a central office 8, an ATM switch 10, electronically switches ATM data cells in 155 Mbps Synchronous Optical Network (SONET) channels among four local offices 40. Each local office 40 is preset for a different wavelength $\lambda_1$, $\lambda_2$, $\lambda_3$ and $\lambda_4$ in the 1.55 $\mu$m optical channel. The ATM switch 10, is coupled to four optical transmitters 12. The signal of each optical transmitter 12 is preset to a different wavelength $\lambda_1$, $\lambda_2$, $\lambda_3$ and $\lambda_4$ corresponding to one of the four local offices 40. The outputs of the four optical transmitters 12 are coupled to a 2×4 star coupler 14 which has a 6 dB splitting loss. The 2×4 star coupler 14 combines the signals from the four optical transmitters 12 and provides combined output signals at two output ports. The outputs of four optical receivers 16 are coupled to the ATM switch 10. A wavelength grating router (WGR) 18 demultiplexes the WDM signal. The WGR 18 is coupled to the four optical receivers 16 for demodulation of the optical signal to a baseband signal for the ATM switch 10. A server 20 is coupled to the ATM switch 10. The server 20 can multicast to the four local offices 40.

A restoration switch 22 is comprised of a first electromechanical optical switch 24 and a second electromechanical optical switch 26. The restoration switch 22 is normally in an open position and is closed in response to a central alarm line 28.

A first optical fiber 30 is coupled between one side of the first electro-mechanical optical switch 24 and one output port of the 2×4 star coupler 14. A bypass optical fiber 32 is coupled between the other output port of the 2×4 star coupler 14 and one side of the second electromechanical optical switch 26. A second optical fiber 34 is coupled between the input of the WGR 18 and the other side of the second electromechanical optical switch 26. A 3 dB tap 36 is coupled to the second optical fiber 34. A restoration optical fiber 38 is coupled between the 3 dB tap 36 and the other side of the first electromechanical optical switch 24.

Each local office 40 comprise a local work station 42 which is coupled to a local transmitter 44 and a local receiver 46. The local receiver 46 is coupled to a local filter 48. A first 3 dB tap 50 is coupled to the first optical line 30. A second 3 dB tap 52 is coupled to the second optical line 34. A dual 1×2 optical mechanical switch 54 is coupled to the first 3 dB tap 50, the second 3 dB tap 52, the input of the local filter 48, and the output of the local transmitter 44.

The dual 1×2 optical mechanical switch 54 is normally in a first position and switches to a second position in response to a local alarm signal 56. When the dual 1×2 optical mechanical switch 54 is in the first position, the input of the local filter 48 is optically connected to the first 3 dB tap 50 and the output of the local transmitter 44 is optically connected to the second 3 dB tap 52. When the dual 1×2 optical mechanical switch 54 is in the second position, the input of the local filter 48 is optically connected to the second 3 dB tap 52 and the output of the local transmitter 44 is optically connected to the first 3 dB tap 50. The switching time of the dual 1×2 optical mechanical switch 54, the first electro mechanical optical switch 24 and the second electro mechanical optical switch 26 are approximately 50 msec.

The add/drop circuitry consists of the first 3 dB tap 50, the second 3 dB tap 52, and the local filter 48. The local filter 48 is a tunable optical filter, having a 3 dB bandwidth of 0.9 µm and an insertion loss of approximately 3.5 dB. The tunable optical filter of each local office 40 is preset to a different wavelength $\lambda_1$, $\lambda_2$, $\lambda_3$ and $\lambda_4$ which corresponds to the wavelength of the local transmitter 44. The total dropping loss is approximately 7 dB while the total adding loss is less than 4 dB. The tunable optical filters allow wavelength reconfiguration for the signal received by the local offices 40. Each local office 40 can utilize different wavelengths for transmission and reception, and shall be explained in detail below.

In order to maintain the optical signal level well above the noise level, fiber optic amplifiers 60 are positioned after two local offices 40, in the first optical fiber 30 and the second optical fiber 34.

The WDM ring network employing the present invention has a normal mode of operation and a failure mode of operation.

In the normal mode of operation the first optical fiber 30 carries data from the 2×4 star coupler 14 to the local offices 40 and the second optical fiber 34 carries data from the local offices 40 to the WGR 18. The central alarm 28 is off and restoration switch 22 is in the open position. The local alarm 56 is off and the dual 1×2 optical mechanical switch 54 is in the first position.

Figure 1B:
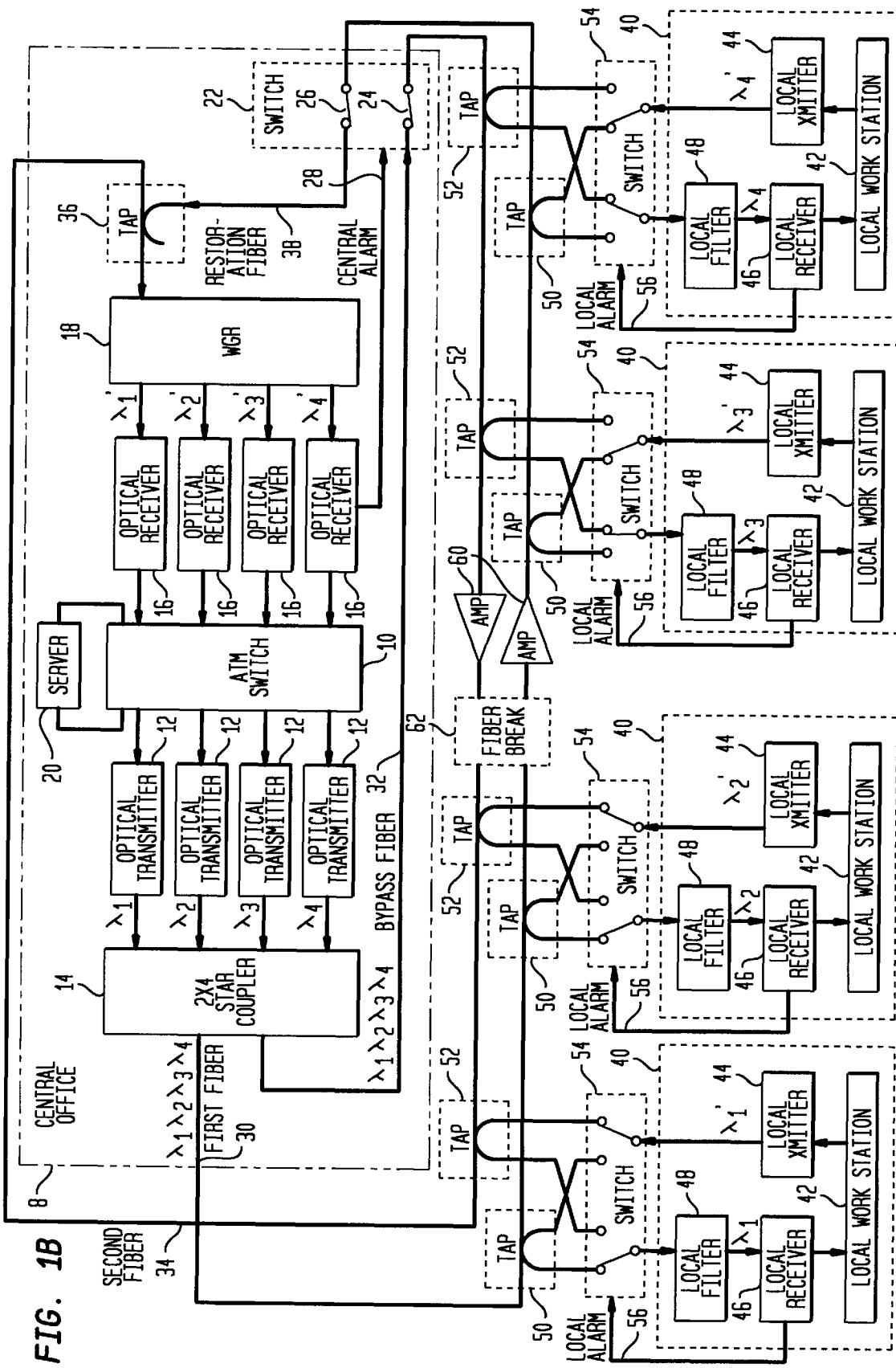
FIG. 1B shows a schematic illustration of an optically restorable WDM ring network in operation after simultaneous fiber failure.

Referring to FIG. 1B there is shown a schematic representation of the optically restorable WDM ring network, shown in FIG. 1A, in the failure mode of operation. A simultaneous break 62 in the first optical fiber 30 and the second optical fiber 34 has occurred.

A local office 40 located downstream from the simultaneous break 62 has the normal data path severed because the first optical fiber 30 and the second optical fiber 34 are isolated downstream of the simultaneous break 62. The local office 40 turns on the local alarm 56 in the absence of a received signal. The local alarm 56 is on which causes the optical mechanical switch 54 to change to the second position, essentially connecting the local transmitter 44 and the local filter 48 to the alternate optical fibers. Simultaneously to the local alarm 56 turning on, the central alarm 28 is turned on. This can be accomplished by the monitoring of the presence of a signal on the first optical fiber 30 at the downstream end by a simple photodiode or other method. The central alarm 28 is on which causes the restoration switch 22 to close. When the restoration switch 22 is closed, the portion of the second optical fiber 34 downstream of the simultaneous break 62 is coupled to the bypass optical fiber 32.

The bypass optical fiber 32 carries data from the 2×4 star coupler 14 to the portion of the second optical fiber 34 downstream of the simultaneous break 62 to the local offices 40 downstream of the simultaneous break 62. The portion of the first optical fiber 30 downstream of the simultaneous break 62 carries data from the local offices 40 downstream of the simultaneous break 62 to the restoration optical fiber 38 to the 3 dB tap 36 to the WGR 18. Resulting in the restoration of data traffic to the local offices 40 downstream of the simultaneous break 62.

When a simultaneous break occurs after the last downstream local office 40, it will not disrupt normal data traffic, however it will compromise the WDM ring network integrity and the ability for restoration of another failure. Therefore, this type of failure must be detected by the central alarm 28 so that the integrity of the WDM ring network can be restored.

While the present invention as described above assumes a simultaneous break of the optical fibers, the restoration system can be adapted for the case of a single fiber break or the failure of a single optical amplifier 60. To adapt the restoration system for the single failure, each local office 40 is preset for a different wavelength $\lambda_1$, $\lambda_2$, $\lambda_3$ and $\lambda_4$ for receiving and is preset to a correspondingly different wavelength $\lambda'_1$, $\lambda'_2$, $\lambda'_3$ and $\lambda'_4$ for transmitting. Further, the central office 8 must stop the optical transmitter 14 from transmitting to a corresponding local office 40 from which a signal has not been received.

Figure 1C:
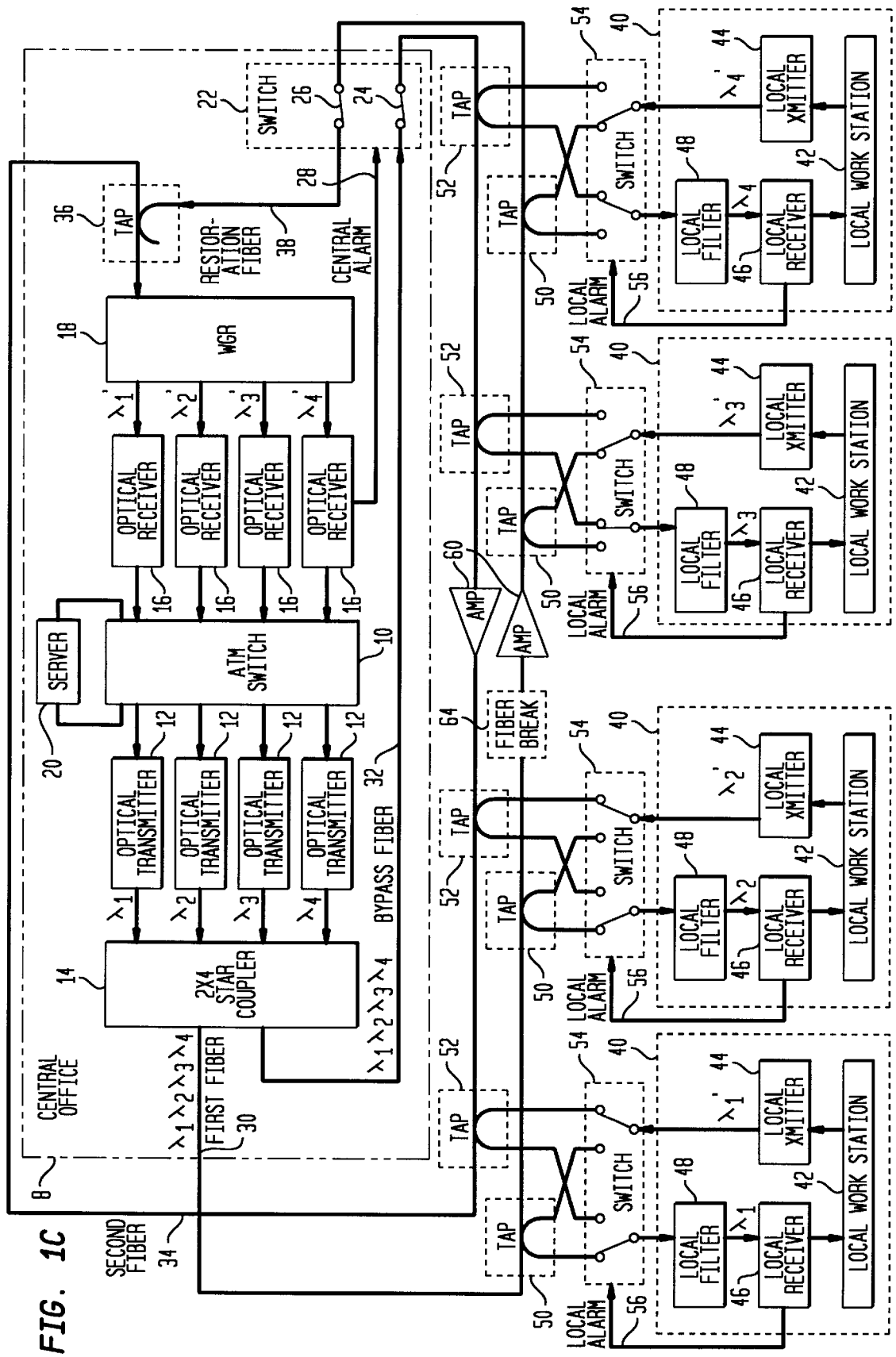
FIGS. 1C and 1D show schematic illustrations of an optically restorable WDM ring network in operation after a single fiber failure.

Referring to FIG. 1C there is shown a schematic representation of the optically restorable WDM ring network, shown in FIG. 1A, in the case of a failure of only the first optical fiber 30.

A local office 40 located downstream from the fiber break 64 in the first optical fiber 30 has the normal data path severed. The local office 40 turns on the local alarm 56 in the absence of a received signal. The local alarm 56 is on, which causes the dual 1×2 optical mechanical switch 54 to change to the second position, essentially connecting the local transmitter 44 and the local filter 48 to the alternate optical fibers. Simultaneously to the local alarm 56 turning on, the central alarm 28 is turned on. The WDM ring network has been restored, however the second optical fiber 34 now contains the signals transmitted by the optical transmitters 12 in addition to the signals transmitted by the local offices 40 not isolated by the fiber break. The extra signals are filtered out when the signal is demultiplexed.

Figure 1D:
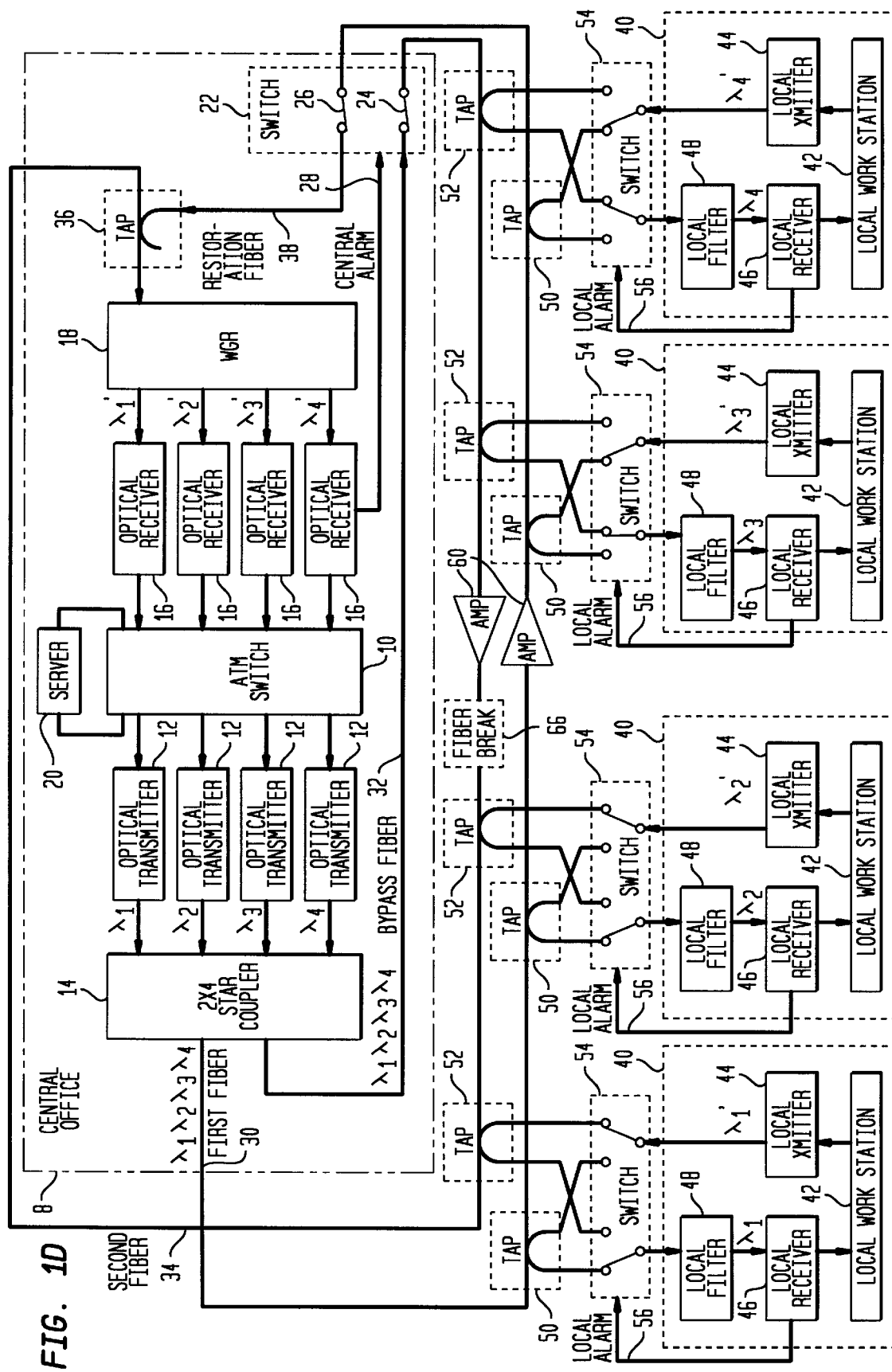

Referring to FIG. 1D there is shown a schematic representation of the optically restorable WM ring network, shown in FIG. 1A, in the case of a failure of only the second optical fiber 34.

The central office 8 detects a fiber break 66 in the second optical fiber and determines which local offices 40 have not transmitted a signal. The central office 8 then implements a momentary stoppage of the corresponding optical transmitter 12. This causes the local office 40 to turn on the local alarm 56 in the absence of a received signal. The local alarm 56 is on which causes the dual 1×2 optical mechanical switch 54 to change to the second position, essentially connecting the local transmitter 44 and the local filter 48 to the alternate optical fibers. Simultaneously to the local alarm 56 turning on, the central alarm 28 is turned on. The WDM ring network has been restored, however the first optical fiber 30 now contains the signals transmitted by the optical transmitters 12 in addition to the signals transmitted by the local offices 40 not isolated by the fiber break. The extra signals are filtered out when the signal is demultiplexed.

The WDM ring network as described above, was demonstrated with video data traffic at 155 Mb/s, which is the bit rate supported by the ATM switch 10. Three Sun workstations were connected as the local work stations 42 of the local offices 40. The local transmitter 44 of the remaining local office 40 was modulated by a pseudo random NRZ bit stream at 155 Mb/s. A video signal was supplied by a VCR and was simultaneously broadcast by the central office 8 to all local offices. The simultaneous break 62 was simulated by an optical switch located in the first optical fiber 30 and the second optical fiber 34 downstream of the second local office 40. After the simultaneous break 62 the WDM ring network was restored in 50 msec, resulting in no visible video degradation. Between the occurrence of the simultaneous break 62 and restoration of the WDM ring network, no more than one video frame should be lost, because the compressed digital video frame rate is less than 24 frames/sec.

Referring to FIG. 2 in conjunction with FIG. 1, there is shown a schematic representation of a local network 70 which can be substituted for the local work station 42. This configuration allows a larger network serving more users than the bandwidth can be divided into. By connecting a local network 72 in place of a local work station 42, each local station 40 becomes a local network hub interconnected to similar local networks. However, while the number of total users is increased, the maximum system capacity, maximum number of simultaneous users, has not increased. The maximum system capacity is a function of the bandwidth of the network. The local workstation 42 has a receiver port 68 and a transmitter port 70.

The local network 72 comprises a local ATM switch 74 having a receiver port 76 and a transmitter port 78 which are connected in place of the receiver port 68 and the transmitter port 70 of the local work station 42. A plurality of network work stations 80 are coupled to the local ATM switch 74.

The functioning of restoration of the WDM ring network is the same as was described above where the local office 40 has a local work station 42.

Numerous modifications and alternative embodiments of the invention will be apparent of those skilled in the art in view of the foregoing description. Accordingly, this description is to be construed as illustrative only and is for the purpose of teaching those skilled in the art the best mode of caring out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

We claim:

1. A restorable parallel ring network comprising:

a first transmission medium;

a central transmitter coupled to one end of said first transmission medium;

a second transmission medium;

a central receiver coupled to one end of said second transmission medium;

central sensing means for sensing a transmission medium failure centrally and providing a central alarm;

coupling means for coupling another end of said first transmission medium to said central receiver and coupling another end of said second transmission medium to said central transmitter in response to said central alarm;

at least one local station, said at least one local station comprising a local receiver, a local transmitter, local sensing means for sensing a transmission medium failure locally and providing a local alarm, and local switching means having a first position and a second position, said local switching means moving from said first position to said second position in response to said local alarm;

wherein said local transmitter is coupled to said second transmission medium and said local receiver is coupled to said first transmission medium when said local switching means is in said first position, said local transmitter is coupled to said first transmission medium and said local receiver is coupled to said second transmission medium when said local switching means is in said second position, and an operating frequency of said local transmitter is different than an operating frequency of said local receiver.

2. The apparatus as recited in claim 1, wherein said first transmission medium is a first optical fiber and said second transmission medium is a second optical fiber.

3. The apparatus as recited in claim 2 further comprising an optical filter, said optical filter coupled between said local receiver and said first optical fiber when said local switching means is in said first position and coupled between said local receiver and said second optical fiber when said switching means is in said second position.

4. The apparatus as recited in claim 2, wherein said local switching means comprises dual 1×2 optical switches.

5. The apparatus as recited in claim 4, wherein said dual 1×2 optical switches are coupled to said first transmission medium by a first optical tap and are coupled to said second transmission medium by a second optical tap.

6. The apparatus as recited in claim 1, wherein said local sensing means comprises a means for providing a local alarm signal in response to an absence of a signal at said local receiver.

7. The apparatus as recited in claim 1, wherein said coupling means comprises two switches.

8. An apparatus for restoring a parallel optical ring network, said network comprising a first optical fiber, a central transmitter coupled to one end of said first optical fiber, a second optical fiber, a central receiver coupled to one end of said second optical fiber, at least one local station, said at least one local station comprising a local receiver and a local transmitter, said apparatus comprising:

central sensing means for sensing a fiber failure centrally and providing a central alarm;

coupling means for coupling another end of said first optical fiber to said central receiver and coupling another end of said second optical fiber to said central transmitter in response to said central alarm signal;

local sensing means for sensing a fiber failure locally and providing a local alarm;

local switching means for switching having a first position and a second position, said local switching means moving from said first position to said second position in response to said local alarm;

wherein said local transmitter is coupled to said second optical fiber and said local receiver is coupled to said first optical fiber when said local switching means is in said first position, said local transmitter is coupled to said first optical fiber and said local receiver is coupled to said second optical fiber when said local switching means is in said second position, and an operating frequency of said local transmitter is different than an operating frequency of said local receiver.

9. The apparatus as recited in claim 8, wherein said local switching means comprises dual 1×2 optical switches.

10. The apparatus as recited in claim 9, wherein said dual 1×2 optical switches are coupled to said first optical fiber by a first optical tap and are coupled to said second optical fiber by a second optical tap.

11. The apparatus as recited in claim 8, wherein said coupling means comprises two optical switches.

12. The apparatus as recited in claim 8, wherein said local sensing means comprises a means for providing a local alarm signal in response to an absence of a signal at said local receiver.

13. A method for restoring a parallel ring network, said network comprising a first transmission medium, a central transmitter coupled to one end of said first transmission medium, a second transmission medium, a central receiver coupled to one end of said second transmission medium, at least one local station, said at least one local station comprising a local receiver and a local transmitter, said method comprising the steps of:

transmitting from said local transmitter at an operating frequency different than an operating frequency of said local receiver:

sensing a transmission medium failure centrally;

providing a central alarm signal in response to said transmission medium failure centrally;

coupling another end of said first transmission medium to said central receiver in response to said central alarm signal;

coupling another end of said second transmission medium to said central transmitter in response to said central alarm signal;

sensing a transmission medium failure locally;

providing a local alarm signal in response to said transmission medium failure locally;

switching said local transmitter from said second transmission medium to said first transmission medium in response to said local alarm signal; and, switching said local receiver from said first transmission medium to said second transmission medium in response to said local alarm signal.

14. The method as recited in claim 13 wherein the step of sensing a transmission medium failure locally comprises detecting an absence of a signal at said local receiver.

15. The method as recited in claim 13 wherein the step of sensing a transmission medium failure centrally comprises detecting an absence of a signal at said central receiver.

16. The method as recited in claim 13 wherein the step of sensing a transmission medium failure centrally comprises detecting an absence of a signal at said another end of said first transmission medium.

17. A central apparatus for restoring a parallel ring network, said network comprising a first transmission medium, a second transmission medium, at least one local station, said at least one local station comprising a local receiver and a local transmitter, said apparatus comprising:

a central transmitter coupled to one end of said first transmission medium;

a central receiver coupled to one end of said second transmission medium;

central sensing means for sensing a transmission medium failure centrally and providing a central alarm;

coupling means for coupling another end of said first transmission medium to said central receiver and coupling another end of said second transmission medium to said central transmitter in response to said central alarm;

wherein an operating frequency of said local transmitter is different than an operating frequency of said local receiver.

18. A local apparatus for restoring a parallel ring network, said network comprising a first transmission medium, a central transmitter coupled to one end of said first transmission medium, a second transmission medium, a central receiver coupled to one end of said second transmission medium, said apparatus comprising:

at least one local station, said at least one local station comprising a local receiver, a local transmitter, local sensing means for sensing a transmission medium failure locally and providing a local alarm, and local switching means having a first position and a second position, said local switching means moving from said first position to said second position in response to said local alarm;

wherein said local transmitter is coupled to said first transmission medium and said local receiver is coupled to said first transmission medium when said local switching means is in said first position, said local transmitter is coupled to said first transmission medium and said local receiver is coupled to said first transmission medium when said local switching means is in said second position, and an operating frequency of said local transmitter is different than an operating frequency of said local receiver.

19. The apparatus as recited in claim 18, wherein said local sensing means comprises a means for providing a local alarm signal in response to an absence of a signal at said local receiver.

* * * * *